United States Patent [19]
Adachi

[11] Patent Number: 4,589,111
[45] Date of Patent: May 13, 1986

[54] ARQ EQUIPPED DATA COMMUNICATION SYSTEM

[75] Inventor: Eiichi Adachi, Atsugi, Japan

[73] Assignee: Ricoh Company, Ltd.

[21] Appl. No.: 504,212

[22] Filed: Jun. 14, 1983

[30] Foreign Application Priority Data

Jun. 14, 1982 [JP] Japan .................................. 57-101596

[51] Int. Cl.$^4$ ....................... G08C 25/02; G06F 11/10
[52] U.S. Cl. ............................................ 371/32; 371/5
[58] Field of Search .................................. 371/32, 34, 5

[56] References Cited

U.S. PATENT DOCUMENTS

| 4,149,142 | 4/1979 | Kageyama et al. | 371/32 |
| 4,270,205 | 5/1981 | DeShon | 371/32 |
| 4,390,497 | 6/1983 | DeShon | 371/32 X |

OTHER PUBLICATIONS

Woodruff, Automatic and Adoptive System for Efficient Communication in Noisy Communication Line Environments, IBM Tech. Disclosure, 2/82, vol. 24, No. 9, pp. 4627-4629.

Primary Examiner—Charles E. Atkinson
Attorney, Agent, or Firm—Guy W. Shoup

[57] ABSTRACT

A data communication system having an automatic request for repetition ("ARQ") function shifts down its MODEM rate to a slower value when the number of trials of retransmission has reached a predetermined value. In the present system, the predetermined value is supplied from the receiver to the transmitter prior to transmission operation of data from the transmitter to the receiver, thereby allowing to maintain a high use rate of the transmission line without significantly decreasing the overall data transmission speed.

6 Claims, 4 Drawing Figures

ARQ EQUIPPED DATA COMMUNICATION SYSTEM

BACKGROUND OF THE INVENTION

1. Field of the Invention

This invention generally relates to a data communication system, and, in particular, to a data communication system having an ARQ (Automatic Request for Repetition) function. More specifically, the present invention relates to an ARQ equipped data communication system capable of rapidly shifting down the data transmission rate when using a transmission line of poor quality.

2. Description of the Prior Art

In general, in a data communication system, in order to transmit data securely from a transmitter to a receiver through a transmission line, use is commonly made of an Automatic Request for Repetition (hereinafter simply referred to as "ARQ") system, in which a Cyclic Redundancy Checkcord, or simply "CRC", bit to be used for detecting the presence of an error is added to the information to be transmitted as input from a terminal device into the transmitter and such CRC bit added information is converted into codes, which are then transmitted to the receiver block by block, each block consisting of a predetermined number of characters, the receiver transmitting a signal requesting retransmission of a block if an error has been detected in the corresponding block.

For example, in the hand-shaking system, which falls onto the category of the ARQ system, on the basis of a backward signal transmitted from the receiver in half-duplex communication, the transmitter determines whether to transmit the next following block of new data or to retransmit the last preceding block of old data. On the other hand, the receiver examines whether a block of data transmitted from the transmitter has been received without error and then supplies a backward signal on the basis of its result. In accordance with another system which is directed to shorten the data transmission time period, the transmitter transmits a plurality of blocks of data consecutively; on the other hand, upon receipt of these blocks of data, the receiver carries out error detection for each of the blocks of data thus received and then supplies the block number of the block having an error to the transmitter. In a single block of data, in the case of a facsimile communication system, there are contained image information, flag command (including block number) and CRC bit, so that the receiver examines the CRC bit of the block received and compares its result with the added CRC bit, whereby the receiver requests retransmission of block of data to the transmitter if they do not match, or the block number received differs from the expected number, or the flag has been destroyed.

Under the circumstances, due to various reasons such as machine failure and failure or abnormal conditions of transmission line, error may be detected at the receiver even if the same block of data is repetitively transmitted over a number of times. In such a case, in accordance with the conventional ARQ data communication system, if the number of retransmission trials exceeds a predetermined number, the hung-up condition is established thereby supplying a disconnect ("DCN") command and having the transmission line disconnected. However, it is often the case that such a disconnected transmission could be carried out completely without error and hung-up if it were carried out at a lower data transmission rate. Nonetheless, since the conventional ARQ data communication system is not equipped with a function of shifting down the data transmission rate during transmission of image information, the data transmission method described above cannot be adopted.

Under the foregoing premise, a patent application has been filed (Japanese Patent Appln. No. 56-171055, assigned to the assignee of this U.S. Patent application) on an invention of data communication system having a shift down function, wherein, in an ARQ equipped facsimile communication system, upon detection of the condition that the number of retransmission trials has exceeded a predetermined number at the transmitter, a shift down command is supplied to the receiver using a slower MODEM different from the MODEM which has so far been used in transmitting image information, thereby allowing to transmit image information at a shifted down data transmission rate. With such a system, it is now possible to shift down the data transmission rate during the transmission of image information, so that hung-up condition can be avoided even if retransmission is requested over a predetermined number of times. In addition, since a shift down command is supplied at a slower MODEM which differs from the MODEM used in transmission of image information, the command can be supplied to the receiver securely.

However, transmitters and receivers are installed at quite a variety of places so that the quality of transmission line also varies markedly from place to place and it may be quite poor at some places. There are also various causes to make the transmission line low in quality; for example, in some places, the transmission line may be always low in quality because it has a lower S/N ratio, or, in other places, it may be occasionally low in quality because of route and other environmental conditions. For this reason, in the case of transmitting image information in the above-described data communication system having a shift down function by shifting down the data transmission rate automatically whenever a predetermined condition is met at the transmitter, i.e., the number of request for retransmission having exceeded a predetermined number, the communication of image information between the two terminals both at the places where the quality of transmission line is poor will take an exorbitantly long period of time because it takes time until a proper MODEM has been found.

For example, in the case where four steps of MODEM rate, i.e., 9,600 bps, 7,200 bps, 4,800 bps and 2,400 bps are available, if the transmitter shifts down the data transmission rate one step each time upon receipt of the retransmission request 32 times from the receiver, the time period T necessary for shifting down from 9,600 bps to 2,400 bps may be calculated in the following manner, assuming that the data of approximately 4 k bits are to be transmitted during the period of single retransmission.

$$T = 4,000 \times 32 \times (1/9,600 + 1/7,200 + 1/4,800) \approx 59 \text{ sec.}$$

In this manner, it takes approximately one minute to reach an appropriate MODEM rate, so that the data transmission period tends to be prolonged thereby lowering the use rate of transmission line.

SUMMARY OF THE INVENTION

The above-described disadvantages of the prior art data communication system have been obviated with the present invention. Briefly stated, in accordance with one embodiment of the present invention, there is provided a data communication system having the function of automatic request for repetition ("ARQ") for retransmitting image information by changing the MODEM rate when the number of trials of retransmission has reached a predetermined value wherein the predetermined number to be monitored is supplied from the receiver to the transmitter prior to the transmission of image information. In accordance with another aspect of the present invention, there is provided an ARQ equipped data communication system in which a comparison is made between the monitoring condition supplied from the receiver and the monitoring condition previously determined at the transmitter and the less severer condition is selected for operation.

Therefore, it is a primary object of the present invention to provide an improved data communication method and system.

Another object of the present invention is to provide a data communication system having the function of automatic request for repetition ("ARQ") capable of setting the MODEM rate at an appropriate value quickly depending on the quality of transmission line in use.

A further object of the present invention is to provide a data communication system having the function of automatic request for repetition capable of setting the monitoring condition to be used as a reference in changing the MODEM rate in accordance with the quality of the transmission line of either one of the transmitter and receiver, whichever is poorer.

A still further object of the present invention is to provide an ARQ equipped data communication system which is fast and secure in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
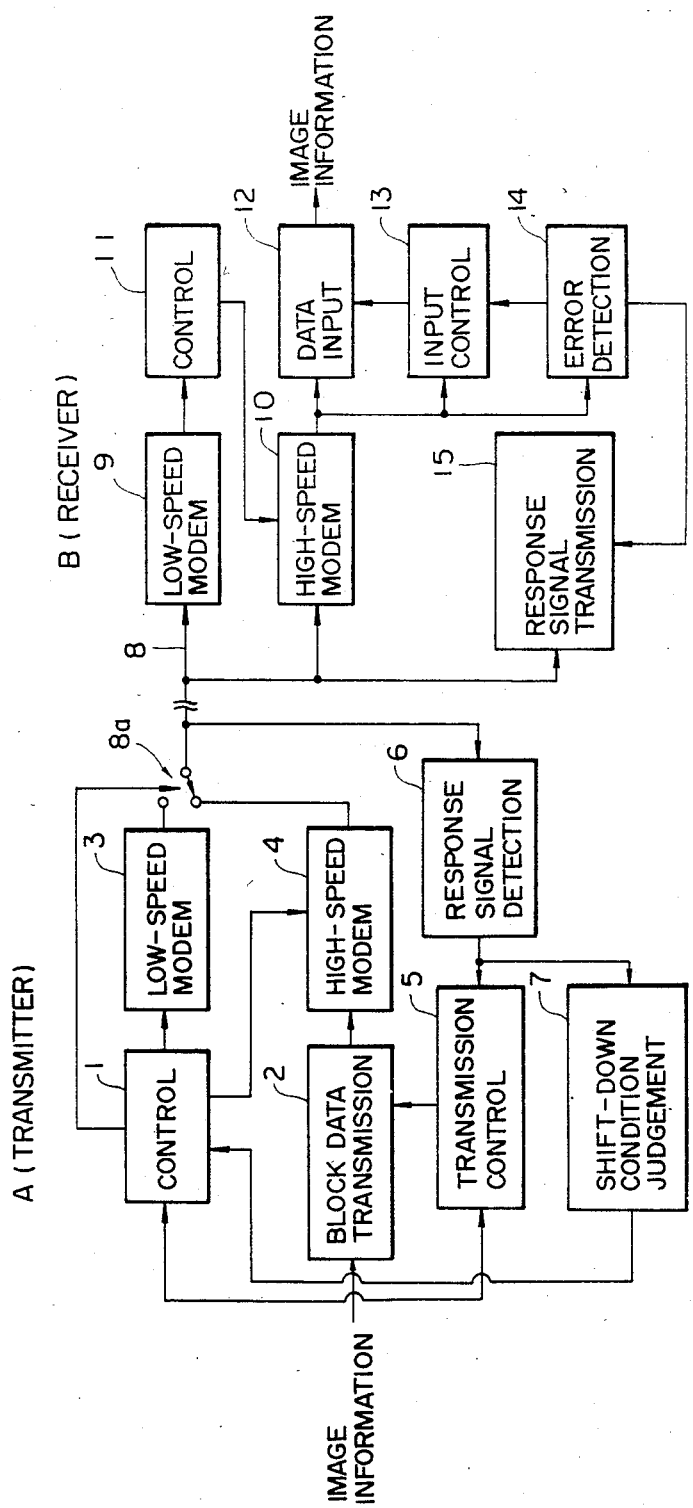
FIG. 1 is a block diagram of a facsimile communication system having the function of automatic request for repetition ("ARQ") constructed in accordance with one embodiment of the present invention.

Referring now to FIG. 1, there is shown a facsimile communication system having the function of automatic request for repetition ("ARQ") constructed in accordance with one embodiment of the present invention. As shown, the system generally comprises a transmitter A and a receiver B connected to the transmitter A via a transmission line 8. At the transmitter side of the transmission line 8 is provided a switch 8a, which is operated under the control of a control circuit 1 to switchingly connect the transmission line 8 either to a low-speed MODEM 3 or to a high-speed MODEM 4. On the other hand, the receiver end of the transmission line 8 is connected both to a low-speed MODEM 9 and to a high-speed MODEM 10, so that the low-speed MODEM 9 monitors image information even if the receiver B is currently processing image information through the high-speed MODEM 10.

The transmitter A includes a block data transmission circuit 2 connected to receive image information converted in the form of codes. At the circuit 2, flag control and CRC bits are added to the coded image information to form a single block of data which is then supplied to the high-speed MODEM 4, which, in turn, causes the block of data to be supplied to the transmission line 8 through the switch 8a. When transmitted to the receiver B, the block of data is then supplied to an error detecting circuit 14 through the high-speed MODEM 10. At the error detecting circuit 14, the CRC check of the block of data received is carried out and then the result of the CRC check is compared with the CRC bit added at the transmitter to see whether they agree or not, thereby supplying an ACK (acknowledgement) signal in the case of agreement between the two signals or a NACK (non-acknowledgment) signal in the case of disagreement between the two signals to a response signal transmission circuit 15 and to an input control circuit 13. The response signal transmission circuit 15 controls a data input circuit 12 to transmit the image information to the next stage only when the error detecting circuit 14 supplies an ACK signal as its output and the block number in the control frame agrees with the expected block number at the receiver. Otherwise, i.e., when the error detecting circuit 14 supplies a NACK signal as its output or the block number received disagrees with the expected block number at the receiver, the response signal transmitting circuit 15 supplies a NACK signal to the transmission line 8 as its output. Further, the circuit 15 also supplies a NACK signal when the flag is destroyed.

The transmitter A also includes a response signal detection circuit 6 which supplies a command for retransmitting the block of data which has not been received by the receiver B to the transmission control circuit 5 which then controls the block data transmission circuit 2 to retransmit the block of data in question.

Furthermore, the transmitter A also includes a shift-down condition judgement circuit 7 which counts the number of trials of retransmission and, when the count has exceeded a predetermined value, apprises to the control circuit 1 of the fact that the shift-down condition has been established. Upon receipt of a shift-down command from the control circuit 1, the transmission control circuit 5 stops to receive further image information after receiving a single frame of image information and returns a signal indicating shift-down ready status to the control circuit 1. Then, the control circuit 1 causes the switch 8a to be operated to have the low-speed MODEM 3 connected to the transmission line 8 instead of the high-speed MODEM 4, so that a shift-down request command is supplied from the low-speed MODEM 3 to the receiver B via the transmission line 8.

The receiver B constantly monitors the supply of a signal from the low-speed MODEM 9, and, when a shift-down request command has been detected by the control circuit 11, the MODEM setting of the high-speed MODEM 10 is shifted down to a slower speed transmission by one step, and, thereafter, a setting completion signal is supplied from the response signal transmission circuit 15 to the transmitter A.

At the transmitter A, when the response signal detecting circuit 6 has detected a setting completion signal supplied from the receiver B, such a detection is apprised to the control circuit 1 through the shift-down condition judgement circuit 7. In response thereto, the control circuit 1 again operates the switch 8a to have the high-speed MODEM 4 connected to the transmission line 8 thereby having the low-speed MODEM 3 disconnected from the line 8. Under the condition, the setting of transmission rate is changed to a slower rate by one step, and, then, upon completion of training, the control circuit 1 supplies a resume-to-transmit command to the transmission control circuit 5. Since the transmission control circuit 5 stores the last block of data which has been transmitted immediately prior to the shift-down operation, the transmission is resumed from this block of data. That is, the block of data is supplied to the transmission line 8 via the block data transmission circuit 2 and high-speed MODEM 4. In this case, the high-speed MODEM 4 is so structured that it may be set at two or more different MODEM rates, for example, at data transmission rate of 9,600 bps, 7,200 bps, 4,800 bps and 2,400 bps.

In accordance with the present invention, an appropriate MODEM rate may be set rapidly in a communication system as described above. For this purpose, in the shift-down condition judgement circuit 7 is previously set a monitoring condition or shift-down condition, such as a number of trials of retransmission, depending on the quality of the transmission line in use.

In the embodiment shown in FIG. 1, since the transmitter A only transmits image information and it does not have a receiving function, it cannot determine the current quality of the transmission line in use; on the other hand, in the place where the receiver B is installed, the quality of the transmission line may be determined in real time because it receives image information. Accordingly, in accordance with the present invention, prior to the step of transmission of image information, a shift-down condition, i.e., number of trials of retransmission, is supplied from the receiver B to the transmitter A where the shift-down condition thus supplied is set. With such a structure, even at the location where the quality of transmission line is poor, an appropriate MODEM rate may be set rapidly.

For example, in the system of FIG. 1, in the case when the number of trials of retransmission has been set to be "8" in the shift-down condition judgement circuit 7 of the transmitter A in accordance with the instruction supplied from the receiver B, if the size of data to be retransmitted at a time is approximately 4 k bits and the MODEM rate may be set at 9,600 bps, 7,200 bps, 4,800 bps and 2,400 bps, the time period T' required to shift down from the maximum rate to the minimum rate may be calculated in the following manner.

$$T' = 4,000 \times 8 \times (1/9,600 + 1/7,200 + 1/4,800) \simeq 15 \text{ sec.}$$

In contrast to 59 seconds required in the case where the shift down condition or the number of trials of retransmission at "32" uniformly in the previous example, the above embodiment of the present invention requires only 15 seconds, thereby allowing to reach the minimum MODEM rate of 2,400 bps faster by 44 seconds as compared with the previous example.

Figure 2:
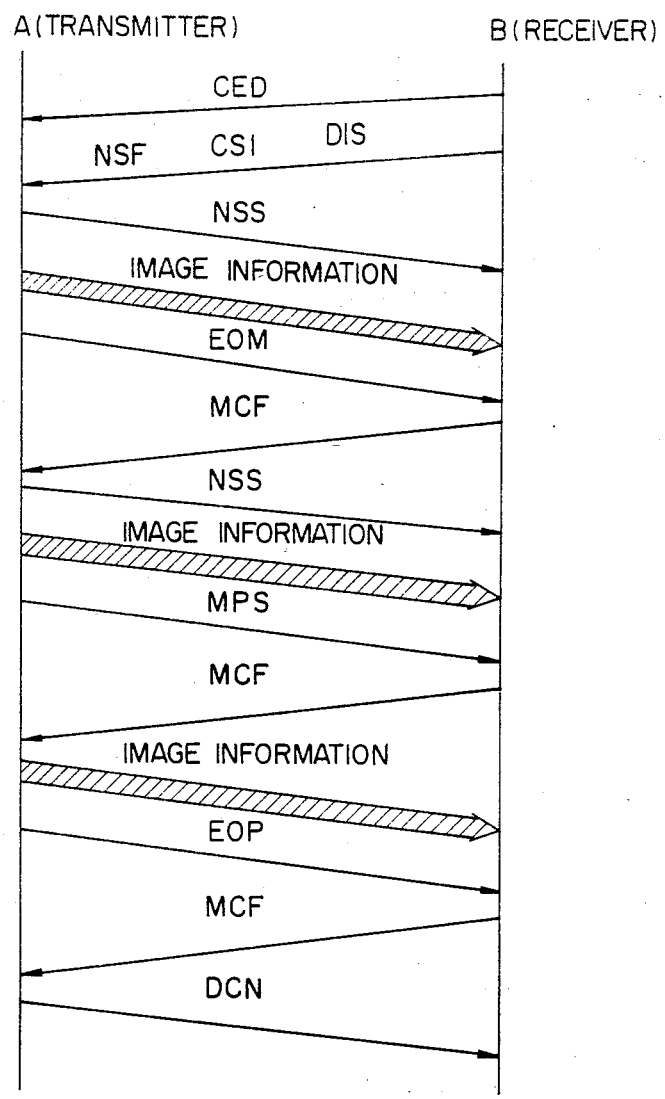
FIG. 2 is a sequence chart showing the protocol for use in the facsimile communication system of FIG. 1.

As shown in FIG. 2, in accordance with the protocol of a facsimile communication system provided with the ARQ function, prior to the transmission operation of image information, the receiver B first (a called station) supplies a CED (Called Station Identification) signal and then three signals NSF (Non-Standard Facilities), CSI (Called Station Identification) and DIS (Digital Identification Signal) consecutively to the transmitter A. The transmitter A carries out function identification, and, after supplying an NSS (Non-Standard Facilities Set-up) signal, it transmits the image information of first page, followed by the step of supplying an EOM (End of Message) signal to the receiver B. Then, the receiver B sends out a MCF (Message Confirmation) signal, and, in response thereto, the transmitter A again sends out a NSS signal, followed by the step of transmission of the image information of second page. In the case of presence of following pages, when a MPS (Multi-Page Signal) signal is supplied from the transmitter A, the receiver B returns the MCF signal to the transmitter A after confirmation.

Then, if there is no more following page after transmitting the image information of third page, the transmitter A supplies an EOP (End of Procedure) signal, and, in response thereto, the receiver B supplies a MCF signal in return after confirmation. The transmitter A then supplies a DCN (Disconnect) signal to have the transmission line disconnected.

In accordance with the present invention, during the protocol period of FIG. 2, the shift-down condition is set in the shift-down condition judgement circuit 7 of the transmitter A. For this reason, the receiver B determines the quality of the transmission line in use in its own place, and the shift-down condition, i.e., the number of trials of retransmission, is supplied to the transmitter A as set in the NSF frame.

Figure 3:
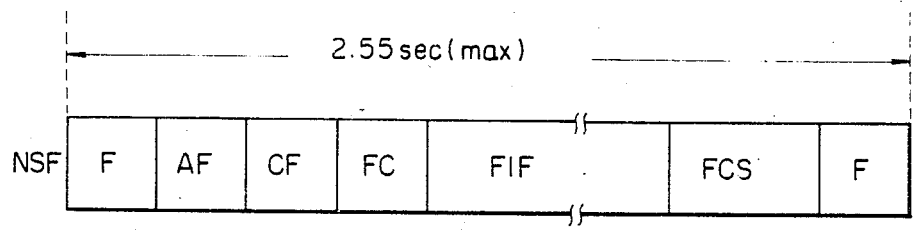
FIG. 3 is a schematic illustration showing the structure of an NSF (Non-standard Facilities) frame.

FIG. 3 shows the structure of a NSF frame, in which "F" indicates flag sequence, "AF" address field, "CF" control field, "FC" facsimile control field, "FIF" facsimile information field, and "FCS" frame check sequence. Since the control information which cannot be included in the facsimile control field "FC", such as model of facsimile machine, mode of transmission and reception, scanning line density and band compression method, is transmitted as set in the facsimile information field "FIF", the shift-down condition (number of trials of retransmission) in accordance with the present invention may well be set in this field "FIF".

In the above-described embodiment, the shift-down condition (number of trials of retransmission) is determined depending on the quality of the transmission line in use at the place of installation of the receiver B. Thus, if the transmitter A is installed in the place where the transmission line is poor in quality in the above-described system, the shift-down condition could be undesirably determined at a better quality condition. To cope with this situation, another embodiment of the present invention provides a structure in which a comparison is made between the shift-down condition (number of trials of retransmission) supplied from the receiver B and the shift-down condition (number of trials of retransmission) determined at the transmitter A and, as a result of such a comparison, the shift-down condition, whichever is lower in quality, is selected and set into the shift-down condition judgement circuit 7.

For example, because of relatively good quality of transmission line at the end of the receiver B, the shift-down condition or number of trials of retransmission of "16" is supplied to the transmitter A as set in the NSF frame; whereas, due to the fact that the quality of transmission line at the side of the transmitter A is poor, the shift-down condition or number of trials of retransmission of "8" is previously set in the shift-down condition judgement circuit 7. Under the circumstances, when these two shift-down conditions "16" and "8" are compared, the lower value, that is, the shift-down condition "8" for the poorer quality of transmission line is selected and set as a final shift-down condition to be used.

Figure 4:
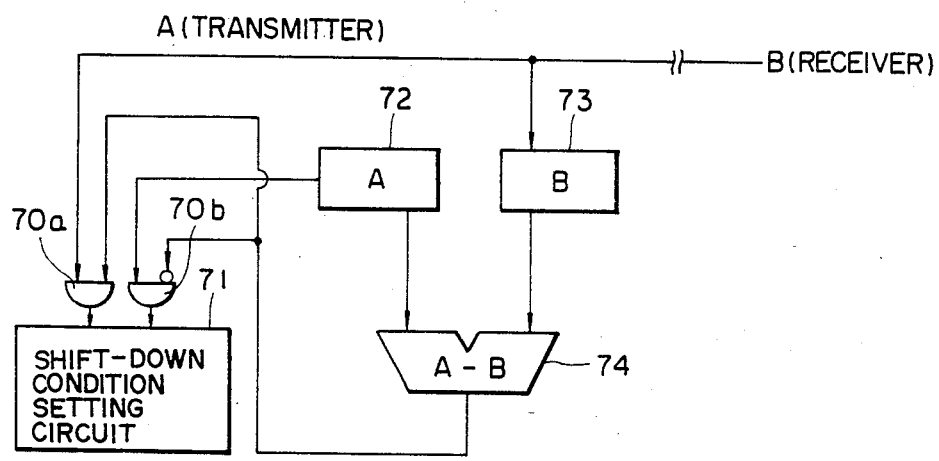
FIG. 4 a block diagram showing the structure for determining the shift-down condition for MODEM rate depending on both of the transmitter and receiver in the communication system of the present invention.

FIG. 4 illustrates the structure of one example of shift-down condition judgement circuit 7 for use in the present invention. As shown, the shift-down condition supplied from the receiver B is taken out of the NSF frame and set into a register 73. On the other hand, at the side of the transmitter A, the shift-down condition is previously determined depending on the quality of the transmission line in use and set in a register 72. When the shift-down condition supplied from the receiver B is set in the register 73, the two values in the registers 72 and 73 are supplied to a subtraction circuit 74 to carry out the subtraction operation of "A−B". If the result indicates that the value "A" in the register 72 is larger than the value "B" in the register 73, the circuit 74 supplies "1" to one input of each of two AND gates 70a and 70b; on the other hand, if the result indicates that the value "A" is smaller than the value "B", the circuit 74 supplies "0" as its output. Accordingly, in the former case, the value "B" in the register 73 is set into a shift-down condition setting circuit 71; whereas, in the latter case, the value "A" in the register 72 is set into the circuit 71. With such a structure, even if either one or both of the transmitter and receiver is installed in the place where the quality of transmission line is poor, the shift-down condition can be set at an appropriate value at all times.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A data communication system comprising:
   a transmitter for transmitting data at a variable MODEM rate;
   a receiver for receiving said data transmitted from said transmitter at a variable MODEM rate;
   a transmission line connecting said transmitter to said receiver;
   means for retransmitting at least a part of said data from said transmitter to said receiver at a second MODEM rate when the number of trails of retransmission of said at least a part of said data at a first MODEM rate has reached a first predetermined number; and
   means for supplying said first predetermined number from said receiver to said transmitter prior to transmission of said at least a part of said data from said transmitter to said receiver thereby allowing to set said first predetermined number varyingly depending on said receiver connected to said transmitter for communication of said data through said transmission line.

2. A system of claim 1, wherein said transmitter includes means for storing a second predetermined number and means for selecting one of said first and second predetermined numbers for use by comparison therebetween.

3. A system of claim 2, wherein said means for selecting includes a logic circuit to select the one which is smaller in number for use.

4. A system of claim 1 wherein said transmitter transmits data to said receiver block by block, each block including a predetermined number of data.

5. A system of claim 4, wherein said data includes facsimile image information.

6. A system of claim 1, wherein said means for retransmitting includes a MODEM rate shift-down structure which causes to set said second MODEM rate slower than said first MODEM rate.

* * * * *